(12) United States Patent
Shirley, Jr. et al.

(10) Patent No.: US 12,486,205 B2
(45) Date of Patent: *Dec. 2, 2025

(54) SEED COATING TO PROMOTE PLANT GROWTH AND METHOD OF INCREASING PLANT YIELD

(71) Applicant: Innovations for World Nutrition, LLC, Florence, AL (US)

(72) Inventors: Arthur R. Shirley, Jr., Florence, AL (US); Melissa C. Hayes, Florence, AL (US)

(73) Assignee: INNOVATIONS FOR WORLD NUTRITION, LLC, Florence, AL (US)

( * ) Notice: Subject to any disclaimer, the term of this patent is extended or adjusted under 35 U.S.C. 154(b) by 415 days.

This patent is subject to a terminal disclaimer.

(21) Appl. No.: 17/513,030

(22) Filed: Oct. 28, 2021

(65) Prior Publication Data
US 2022/0048830 A1 Feb. 17, 2022

Related U.S. Application Data

(63) Continuation of application No. 17/227,596, filed on Apr. 12, 2021, now Pat. No. 11,192,830.
(Continued)

(51) Int. Cl.
| | |
|---|---|
| *C05D 1/00* | (2006.01) |
| *A01C 1/06* | (2006.01) |

(Continued)

(52) U.S. Cl.
CPC ............... *C05D 1/00* (2013.01); *A01C 1/06* (2013.01); *C05C 9/005* (2013.01); *C05D 9/00* (2013.01);
(Continued)

(58) Field of Classification Search
CPC ... C05D 1/00; C05D 9/00; C05F 11/02; C05F 11/08; A01C 1/06; C09D 199/00; C09D 201/00
See application file for complete search history.

(56) References Cited

U.S. PATENT DOCUMENTS

| | | |
|---|---|---|
| 1,870,131 A | 8/1932 | Meier |
| 3,197,302 A | 7/1965 | MacBride |

(Continued)

FOREIGN PATENT DOCUMENTS

| | | |
|---|---|---|
| BR | 409658 | 4/1934 |
| BR | 1287749 | 6/1972 |

(Continued)

OTHER PUBLICATIONS

Viktor. "The influence of root assimilated inorganic carbon on nitrogen acquisition/assimilation and carbon partitioning." New Phytol. 165, 1 (2005): 157-69.
(Continued)

*Primary Examiner* — Wayne A Langel
(74) *Attorney, Agent, or Firm* — Jeffrey S. Melcher; Melcher Patent Law PLLC

(57) ABSTRACT

A seed coated with a seed grind, and optionally a source of sugar, a source of bicarbonate, and/or a source of fertilizer nutrient to supply plant roots with additional uptake-available carbon and energy to promote rapid growth. A method of coating seeds with the coating and a method of growing plants from the coated seed.

25 Claims, 2 Drawing Sheets

Related U.S. Application Data

(60) Provisional application No. 63/010,089, filed on Apr. 15, 2020.

(51) Int. Cl.

| | | |
|---|---|---|
| *C05C 9/00* | (2006.01) | |
| *C05D 9/00* | (2006.01) | |
| *C05F 11/02* | (2006.01) | |
| *C05F 11/08* | (2006.01) | |
| *C09D 199/00* | (2006.01) | |
| *C09D 201/00* | (2006.01) | |

(52) U.S. Cl.
CPC .............. *C05F 11/02* (2013.01); *C05F 11/08* (2013.01); *C09D 199/00* (2013.01); *C09D 201/00* (2013.01)

(56) References Cited

U.S. PATENT DOCUMENTS

| | | | |
|---|---|---|---|
| 3,506,432 A | 4/1970 | Arita | |
| 4,003,160 A | 1/1977 | Muller | |
| 4,026,695 A | 5/1977 | Young | |
| 4,559,076 A | 12/1985 | Young | |
| 4,571,256 A | 2/1986 | Takagi | |
| 5,044,117 A | 9/1991 | Kuckens | |
| 5,308,373 A | 5/1994 | Moore | |
| 5,338,551 A | 8/1994 | Ajoie | |
| 5,432,148 A | 7/1995 | Winston | |
| 5,433,766 A | 7/1995 | Ming | |
| 5,443,835 A | 8/1995 | Winston | |
| 5,468,715 A | 11/1995 | Joseph | |
| 5,741,521 A | 4/1998 | Knight | |
| 5,849,060 A | 12/1998 | Piping | |
| 5,876,990 A | 3/1999 | Reddy | |
| 6,101,763 A | 8/2000 | Aoki | |
| 6,199,318 B1 | 3/2001 | Stewart et al. | |
| 6,231,633 B1 | 5/2001 | Hirano | |
| 6,358,294 B1 | 3/2002 | Atting | |
| 6,387,145 B1 | 5/2002 | Miele | |
| 6,475,257 B1 | 11/2002 | Baptist | |
| 7,487,892 B1 | 2/2009 | Hirsch | |
| 7,753,984 B2 | 7/2010 | Liu | |
| 7,776,124 B2 | 8/2010 | Binder | |
| 8,328,898 B2 | 12/2012 | Liu | |
| 8,609,145 B2 | 12/2013 | Anderson | |
| 8,883,677 B2 | 11/2014 | Windhoevel | |
| 8,940,074 B2 | 1/2015 | Kuo | |
| 8,979,970 B2 | 3/2015 | Kucera | |
| 9,174,885 B2 | 11/2015 | Taulbee | |
| 9,334,199 B2 | 5/2016 | Kuo | |
| 9,388,343 B2 | 7/2016 | GreenStract | |
| 9,566,240 B2 | 2/2017 | Burch | |
| 9,682,894 B2 | 6/2017 | Gabrielson | |
| 10,986,769 B2 | 4/2021 | Ochampaugh | |
| 11,192,830 B2 * | 12/2021 | Shirley, Jr. | C09D 199/00 |
| 2002/0174697 A1 | 11/2002 | Reid | |
| 2003/0061758 A1 | 4/2003 | Wilson | |
| 2004/0200248 A1 | 10/2004 | Kirkegaard | |
| 2005/0246953 A1 | 11/2005 | Wedegaertner | |
| 2006/0003893 A1 | 1/2006 | Pursell | |
| 2006/0107589 A1 | 5/2006 | Rubin | |
| 2010/0034792 A1 | 2/2010 | Becker | |
| 2011/0113843 A1 | 5/2011 | Mantelatto | |
| 2011/0174032 A1 | 7/2011 | Liu | |
| 2012/0103039 A1 | 5/2012 | Brucher | |
| 2012/0190776 A1 | 7/2012 | Houston | |
| 2014/0069001 A1 | 3/2014 | Rose | |
| 2014/0106964 A1 | 4/2014 | Jogikalmath | |
| 2015/0305251 A1 | 10/2015 | Eyres | |
| 2016/0031763 A1 | 2/2016 | Kim | |
| 2016/0128294 A1 | 5/2016 | Nordskog | |
| 2016/0280613 A1 | 9/2016 | Wickstrom | |
| 2016/0332929 A1 | 11/2016 | McKnight | |
| 2017/0008812 A1 | 1/2017 | Kim | |
| 2017/0152195 A1 | 6/2017 | Terenzio | |
| 2017/0166488 A1 | 6/2017 | Chaudhry | |
| 2017/0354145 A1 | 12/2017 | Rhodia | |
| 2018/0103576 A1 | 4/2018 | Luttrell | |
| 2018/0251654 A1 | 9/2018 | Chen | |
| 2019/0185390 A1 | 6/2019 | Shirley | |
| 2020/0068785 A1 | 3/2020 | Geiger | |
| 2020/0102457 A1 | 4/2020 | Goldstein | |

FOREIGN PATENT DOCUMENTS

| | | |
|---|---|---|
| CN | 1088562 | 6/1994 |
| CN | 1089932 | 7/1994 |
| CN | 1104196 | 6/1995 |
| CN | 1136028 | 11/1996 |
| CN | 1141276 | 1/1997 |
| CN | 1240777 A | 1/2000 |
| CN | 1296934 | 5/2001 |
| CN | 1400196 A | 3/2003 |
| CN | 1408680 A | 4/2003 |
| CN | 1122652 | 10/2003 |
| CN | 1629107 | 6/2005 |
| CN | 101157580 | 4/2008 |
| CN | 101195547 | 6/2008 |
| CN | 101781137 | 7/2010 |
| CN | 102515905 | 6/2012 |
| CN | 102515911 | 6/2012 |
| CN | 102584383 | 7/2012 |
| CN | 102595926 | 7/2012 |
| CN | 10278356 | 11/2012 |
| CN | 102936169 | 2/2013 |
| CN | 102980959 | 3/2013 |
| CN | 108440141 | 3/2013 |
| CN | 103304292 | 9/2013 |
| CN | 103621278 | 10/2013 |
| CN | 103391710 | 11/2013 |
| CN | 103518456 | 1/2014 |
| CN | 103539526 | 1/2014 |
| CN | 103539556 | 1/2014 |
| CN | 03570420 | 2/2014 |
| CN | 103583175 | 2/2014 |
| CN | 03708891 | 4/2014 |
| CN | 104045437 | 9/2014 |
| CN | 104086268 | 10/2014 |
| CN | 104262018 | 1/2015 |
| CN | 104496685 | 4/2015 |
| CN | 104557312 | 4/2015 |
| CN | 104591818 | 5/2015 |
| CN | 104829358 | 8/2015 |
| CN | 104829362 | 8/2015 |
| CN | 104973929 | 10/2015 |
| CN | 105104060 | 12/2015 |
| CN | 105347876 | 2/2016 |
| CN | 105612863 | 6/2016 |
| CN | 105948892 | 9/2016 |
| CN | 106234124 A | 12/2016 |
| CN | 106316495 | 1/2017 |
| CN | 106316532 | 1/2017 |
| CN | 106748313 | 1/2017 |
| CN | 106396772 | 2/2017 |
| CN | 106576795 | 4/2017 |
| CN | 106673843 | 5/2017 |
| CN | 106722658 | 5/2017 |
| CN | 106744771 | 5/2017 |
| CN | 106818732 | 6/2017 |
| CN | 107235814 | 10/2017 |
| CN | 107266141 | 10/2017 |
| CN | 110521324 | 12/2019 |
| EP | 2716620 | 9/2014 |
| FR | 1520587 | 4/1968 |
| JP | 54130367 | 10/1979 |
| JP | 5626796 | 3/1981 |
| JP | H02302387 | 12/1990 |
| JP | H06105620 | 4/1994 |
| JP | 2004285033 | 10/2004 |
| JP | 3128378 | 1/2007 |
| JP | 2008133239 | 6/2008 |
| JP | 201401524 | 1/2014 |
| JP | 2017197529 | 8/2022 |

(56) References Cited

FOREIGN PATENT DOCUMENTS

| WO | 9627288 | 2/1996 |
|---|---|---|
| WO | 01/14285 | 3/2001 |
| WO | 2009091570 | 1/2009 |
| WO | 2010/077127 | 7/2010 |
| WO | 2014/091095 | 6/2014 |
| WO | 2014/101269 | 7/2014 |
| WO | 2014106424 | 7/2014 |
| WO | 2017068038 | 4/2017 |

OTHER PUBLICATIONS

Vuorinen. "Dark CO2 fixation by roots of willow and barley in media with a high level of inorganic carbon." Journal of Plant Physiology. vol. 151, 4 (1997): 405-408.

Hernandez. "Different Bacterial Populations Associated with the Roots and Rhizosphere of Rice Incorporate Plant-Derived Carbon." Appl Environ Microbiol. vol. 81 (2015): 2244-2253.

Bugbee. "CO2 crop growth enhancement and toxicity in wheat and rice." Adv. Space Res. vol. 14, 11 (1994): 257-267.

Razzaque. "Effects of Nitrogen Fertilizer and Elevated CO2 on Dry Matter Production and Yield of Rice Cultivars." Bangladesh J. Agril. Res. 34,2 (2009): 313-322.

Allen. "The CO2 fertilization effect: higher carbohydrate production and retention as biomass and seed yield." Global climate change and agricultural production. direct and indirect effects, Chapter 39. (1996).

Brix. "Uptake and photosynthetic utilization of sediment-derived carbon by Phragmites australis (Cav.) Trin. ex Steudel." Aquatic Botany. vol. 38, 4 (1990): 377-389.

Cannon. "On the Relation of Root Growth and Development to the Temperature and Aeration of the Soil." American Journal of Botany. vol. 2, 5 (1915): 211-224.

Chang. "Effect of Carbon Dioxide on Absorption of Water and Nutrients by Roots." Plant Physiol. vol. 20, 2 (1945): 221-232.

Cramer. "Inorganic carbon fixation and metabolism in maize roots as affected by nitrate and ammonium nutrition." Physiologia Plantarum. vol. 89, 3 (2006): 632-639.

Dilorio. "Carbon dioxide improves the growth of hairy roots cultured on solid medium and in nutrient mists." Applied Microbiology Biotechnology. vol. 37 (1992): 463-467.

Gorski. "1986: Response of eggplant solanum melogena to a root environment enriched with carbon dioxide." Hortsciencesect. vol. 1 (1986): 495-498.

Grinfield. "On the Nutrition of Plants with Carbon Dioxide through the Roots." Physiology of Plants. vol. 97, 5 (1954).

Jin. "Elevated Carbon Dioxide Improves Plant Iron Nutrition through Enhancing the Iron-Deficiency-Induced Responses under Iron-Limited Conditions in Tomato." Plant Physiology. vol. 150 (2009): 272-280.

Written Opinon and International Search Report issued in corresponding PCT/US18/65373, Feb. 27, 2018, pp. 1-41.

Prior art search conducted Jan. 4, 2018, PatPro Inc., Taun Nguyen, pp. 1-7.

Subbaiah, S.V., et al. "Studies on yield maximization through balanced nutrient ratios in irrigated lowland rice." International Rice Commission Newsletter (FAO), 50 (2001): 59-65.

Demand for Chapter II and Response to Written Opinion filed in corresponding PCT/US18/65373, filed May 15, 2019, pp. 1-34.

International Preliminary Report on Patentability issued in PCT/US18/065373, Aug. 27, 2019, pp. 1-13.

Invitation issued in PCT/US/26983, on Jul. 6, 2021, pp. 1-2.

Qiu, "Biostimulant Seed Coating Treatments to Improve Cover Crop Germination and Seedling Growth," Agronomy 2020, 10, 154; doi:10.3390/agronomy10020154, www.mdpi.com/journal/agronomy; Accepted: Jan. 19, 2020; Published: Jan. 22, 2020, pp. 1-14.

Office Action issued in U.S. Appl. No. 17/227,596, Jul. 8, 2021, pp. 1-33.

Amirkhani, "Biostimulant Seed Coating Treatments to Improve Cover Crop Germination and Seedling Growth," agronomy 2020, 10, 154, www.mdpi.com/journal/agronomy, Jan. 22, 2020, pp. 1-14.

Written Opinion issued in PCT/US21/27093, Sep. 17, 2021, pp. 1-16.

Office Action issued in U.S. Appl. No. 17/227,566, filed Jun. 8, 2021, pp. 1-58.

Written Opinion issued in PCT/US21/26983, Sep. 1, 2021, pp. 1-43.

Breene et al. "Sucrose Esters: Their Impact on Soybean Oil Utilization" 1988, pp. 367-380, entire document especially Figure 1, Table 4, Figure 2.

Mad Barn. "Kelp Meal". < https://madbarn.com/feeds/kelp-meal/> Sep. 23, 2020 (Year: 2020).

Zahid, "A comprehensive review on biodegradable polymers and their blends used in controlled release fertilizer processes," Rev., Chem. Eng. 2015; 31(1) pp. 69-95.

Kissel, "Management of urea fertilizers," Kansas State University, 1988.

Cai, et al. "Nitrogen loss from ammonium bicarbonate and urea fertilizers applied to flooded rice," Fertilizer Research 10.3 (1986): 203-215.

Black, et al. "Effects of form of nitrogen, season, and urea application rate on ammonia volatilisation from pastures," New Zealand Journal of Agricultural Research 28.4 (1985): 469-474.

Yong Zhang, "An Eco-Friendly Slow-Release Urea Fertilizer Based on Waste Mulberry Branches for Potential Agriculture and Horticulture Applications," Sustainable Chem. Eng. 2014, 2, 7, 1871-1878.

Yangfang. "k-CarrageenanSodium Alginate Beads and Superabsorbent Coated Nitrogen Fertilizer with Slow-Release, Water-Retention, and Anticompaction Properties," Ind. Eng. Chem. Res., 2012, 51 (3), pp. 1413-1422.

Chen Lung-Yie, et al. "Effect of deep-application of prilled ammonium bicarbonate fertilizer on the nitrogen supplying status of non-calcareous paddy soils." Acta Pedologica Sinica, 15, 75-82 (1978).

Li, et al. "Ammonium bicarbonate used as a nitrogen fertilizer in China." Fertilizer Research (1980) 1: 125.

Savant et al. "Deep placement of urea supergranules in transplanted rice: Principles and practices." Fertilizer Research (1990) 25: 1.

Song, et al. "Study on fertilizer efficiency and its mechanism of urea and ammonium bicarbonate treated with controlled-release technology." Journal fo Plant Nutrition and Fertilizer, 2003, 9(1): 50-56.

Higuchi, et al. "Further evidence for gaseous CO2 transport in relation to root uptake of CO2 in rice plant, Soil Sciene, and Plant Nutrition." 1984, 30:2, 125-136.

Enoch, et al. "Plant response to irrigation with water enriched with carbon dioxide." New Phytologist, 1993,125: 249-258.

Stolwijk, et al. On the Uptake of Carbon Dioxide and Bicarbonate by Roots, and Its Influence on Growth. Plant Physiol. 1957;32(6):513-20.

Harris-Lovett. (Jul. 22, 2015) GMO rice could reduce greenhouse gas emissions, study says. Retrieved from http://www.latimes.com.

Ikeda, et al. (1992) Stimulation of dark carbon fixation in rice and tomato roots by application of ammonium nitrogen, Soil Science and Plant Nutrition, 38:2, 315-322.

Bergquist, (1964) Absorption of Carbon Dioxide by Plant Roots, Botaniska Notiser, 117:3, 249-261.

Allen, et al. (2005) Crop Responses to Elevated Carbon Dioxide and Interaction with Temperature, Journal of Crop Improvement, 13:1-2, 113-155.

Colmer, et al. (2006), Root aeration in rice (*Oryza sativa*): evaluation of oxygen, carbon dioxide, and ethylene as possible regulators of root acclimatizations. New Phytologist, 170: 767-778.

Wikipedia. "Soil Test." Version: Jun. 25, 2017. (Jun. 25, 2017) Retrieved: Feb. 8, 2019 (Feb. 8, 2019). wikipedia.org.

Livingston. "The Soil as Direct Source of Carbon Dioxide for Ordinary Plants" Plant physiology vol. 9,2 (1934): 237-59.

Leonard. "Effect of Various Oxygen and Carbon Dioxide Concentrations on Cotton Root Development" Plant Physiology Jan. 1946, 21 (1) 18-36.

Madhu "Dynamics of Plant Root Growth Under Increased Atmospheric Carbon Dioxide" Agron. J. (2013) 105:657-669.

(56) References Cited

OTHER PUBLICATIONS

Lowe. "Carbon Dioxide Requirement for Growth of Legume Nodule Bacteria" Soil Science vol. 94, 6 (1962): 351-356.
Ma. "An inorganic CO2 diffusion and dissolution process explains negative CO2 fluxes in saline/alkaline soils" Sci. Rep. 3, 2025 (2013): 1-7.
Majeau. "Effect of CO2 Concentration on Carbonic Anhydrase and Ribulose-1,5-Biphosphate Carboxylase/Oxygenase Expression in Pea" Plant Physiol. vol. 112 (1996): 569-574.
Matocha. "Effects of carbon dioxide and iron enrichment of a calcareous soil on Fe-chlorosis, root and shoot development of grain sorghum." Journal of Plant Nutrition. vol. 11, 6-11 (1988): 1503-1515.
Mauney. "Responses of Glasshouse Grown Cotton to Irrigation with Carbon Dioxide-Saturated Water." Crop Sci. vol. 28, 5 (1088): 835-838.
Miller. "Carbon Dioxide-Bicarbonate Absorption, Accumulation, Effects on Various Plant Metabolic Reactions, and Possible Relations to Lime-Induced Chlorosis." Soil Sci. vol. 89, 5 (1960): 241-245.
Mingo-Castel. "Effect of Carbon Dioxide and Ethylene on Tuberization of Isolated Potato Stolons Cultured in Vitro." vol. 53 (1974) 798-801.
Shingo. The intake and utilization of carbon by plant roots from C14-labeled urea Part I. The determination of radioactive carbon of plant materials and a preliminary seedling experiment utilizing C14-labeled urea. Soil Sci. and Plant Nutrition vol. 3,1 (1957): 59-64.
Moore. "Potential for Irrigation with Carbon Dioxide." Acta Hortic. (1990). www.actahort.org.
Niu. "Effect of elevated CO2 on phosphorus nutrition of phosphate-deficient *Arabidopsis thaliana* (L.) Heynh under different nitrogen forms." Journal of Experimental Botany, vol. 64,1 (2013): 355-367.
Nobel. "Soil O2 and CO2 Effects on Root Respiration of Cacti." Plant and Soil. 120,2 (1989). 263-271.
Novero. "Field-grown tomato response to carbonated water application." Agronomy journal. vol.83, 5 (1991): 911-916.
Noyes. "Root Variations Induced by Carbon Dioxide Gas Additions to Soil." Botanical Gazette. vol. 66, 4 (1918): 364-373.
Noyes. "Residual Effects of Carbon Dioxide Gas Additions to Soil on Roots of *Lactuca sativa*." Botanical Gazette. vol. 69,4 (1920): 332-336.
NOYES. "Effects of Saturating Dioxide." Science. vol. 40, 1039 (1914): 792.
Paliwal. "Effect of bicarbonate-rich irrigation waters on the growth, nutrient uptake and synthesis of proteins and carbohydrates in wheat." Plant Soil vol. 43, 1-3 (1975): 523-536.
Palmer. "Cytokinins and Tuber Initiation in the Potato *Solanum tuberosum* L." Nature. vol. 221 (1969): 279-280.
Mitsui. "On the utilization of carbon in fertilizers through rice roots under pot experimental condition." Soil Science and Plant Nutrition. vol. 8,6 (1962): 16-23.
Radford. "New Research Shows Tree Roots Regulate CO2, Keep Climate Stable." Version: Feb. 19, 2014. (Feb. 19, 2014) Retrieved: Jan. 25, 2016 (Jan. 25, 2016). ecowatch.com.
Ryan. "Effect of Surface-Applied Sulfuric Acid on Growth and Nutrient Availability of Five Range Grasses in Calcareous Soils." Journal of Range Management. vol. 28, 5 (1975): 411-414.
Skelding. "The Effect of Carbon Dioxide on the Absorption of Manganese by Root Tissues of Red Beet." Ann Bot. vol. 21, 1 (1957): 121-141.
Skok. "Upate of CO2 by roots of Xanthium plants." Bot. Gaz. 124 (1962): 118-120.
Stoter. "Radioactive Anomalies from Old CO2 in the Soil and Canopy Air." Radiocarbon. vol. 53, 1 (2011): 55-69.
Spittstoesser. "Dark CO2 Fixation and its Role in the Growth of Plant Tissue." Plant Physiol. 41, 5 (1966) 755-759.
Stemmet. "The Uptake of Carbon Dioxide by Plant Roots." Plant and Soil. vol. 17, 3 (1962): 357-364.
Storlie. "Soil, plant, and canopy responses to carbonated irrigation water." Hort. Technology. vol. 6, 2 (1996): 111-114.
Sun. "Effects of elevated CO2 Applied to Potato Roots on the Anatomy and Ultrastructure of Leaves." Biologia Plantarum vol. 55, 4 (2011): 675-680.
Unger. "Influence of Oxygen and Carbon Dioxide on Germination and Seedling Development of Corn (*Zea mays* L.)." Agronomy Journal. vol. 57, 1 (1965): 56-58.
Britannica, The Editors of Encyclopaedia. "sodium". Encyclopedia Britannica, Jan. 7, 2019, <https://www.britannica.com/science/ sodium>. (Year: 2019).
Fernandez, Fabian G., et al. "Managing nitrogen." Illinois agronomy handbook, 24th ed. Univ. of Illinois, Urbana-Champaign, IL ( 2009): 113-132. (Year: 2009).
Isleib, Jim. "Pros and cons of granular and liquid fertilizers." Michigan: Michigan State University Extension (2016). (Year: 2016).
Nutrient Stewardship "Split Fertilizer Application Helps Optimize Nutrient Management" <https://nutrientstewardship.org/ implementation/spl it-fertilizer-application-helps-optimize-nutrient-management/> (Year: 2020).
Fubon "Vinasse" Angel Yeast, 2022 (Year: 2022).
Dodla, Syam, and R. Bogren. "No-till conservation agriculture and fertilizer use." LSU Ag Center (2018). (Year: 2018).
FloraVeg. "Prunus salicina" Factsheet <https://floraveg.eu/en/taxon/overview/Prunus%20salicina> (Year: 2022).
Office Action issued in Chinese Application 2021800288981, Oct. 23, 2024, pp. 1-15.
Office Action issued in Japanese application No. 2022-562774, Feb. 10, 2025, including translation, pp. 1-15.
Office Action issued in Japanese application No. 2022-562757, Feb. 10, 2025, including translation, pp. 1-16.
Baidu Baike "Cornmeal: Traditional Food" <https://baike.baidu.com/item/%E7%8E%89%E7%B1%B3%E9%9D%A2/10167018> 2025 (Year: 2025).
Anticaking agent, wikipedia, Jan. 3, 2022, pp. 1-2.
Dijkstra, "Diet Effects on urine composition of cattle and N2O emmissions," Animal (2013), The animal Consortium, pp. 1-12.
Harrell, D. L., J. A. Bond, and J. Saichuk. "Soils, plant nutrition and fertilization." Louisiana rice production handbook. Pub 2321 ( 2009): 23-34. (Year: 2009).
Jibrin, H., et al. "Nutritive and phytochemical assessment of cotton (*Gossypium* spp.) seed meal for fish feed." Int. J. Fish Aquat. Stud 8 (2020): 380-385. (Year: 2020).
Allance. "What Are Different Types of Fertilizer?" <https ://www. fertilizer-machine. net/solution_and_market/types-of-fertil izer. html> Feb. 21, 2016 (Year: 2016) 020878.
IntelliStellar. "Agriculture Grade Ammonium Bicarbonate Market Research Report Unlocks Analysis on the Market Financial Status, Market Size, and Market Revenue upto 20" Published Sep. 29, 2023<https://www.linkedin.com/pulse/agriculture-grade-ammonium-bicarbonate-market-research/> (Year: 2023).
European Search Report issued in EP Application No. 21787724.0, Apr. 18, 2024, pp. 1-26.
European Search Report issued in EP Application No. 21788794, Apr. 18, 2024, pp. 1-29.
Qiu, Ruofeng, Zhongping Huang, and Lili Wang. "Analysis of fatty acid composition in cottonseed by gas chromatography with on-line pyrolytic methylation." Se pu= Chinese Journal of Chromatography 36.9 (2018): 925-930. (Year: 2018).

\* cited by examiner

CROSS SECTION VIEW

SEED COATING TO PROMOTE PLANT GROWTH AND METHOD OF INCREASING PLANT YIELD

FIELD OF THE INVENTION

The invention relates to a seed coating comprising a seed grind which can further include a source of sugar, a source of bicarbonate, and/or a source of fertilizer nutrient. The invention further is also related to a method of growing plants using the seed coating. The invention further relates to a method of coating seed with the seed coating.

BACKGROUND OF THE INVENTION

Due to rising populations around the world and limited arable land for growing food, finding ways to improve food production is a serious concern. It is well known that plants need energy, nitrogen, phosphorus, potassium, secondary nutrients, micronutrients, water and carbon or carbon dioxide to grow.

When a plant seed first sprouts to form a small seedling, the only carbon, nutrients, and energy available for growth are stored in the seed. Stored within the seed is all that the seedling needs to grow until it can form its roots and to produce leaves. Initially, the roots form and then the leaves. The leaves of the small seedling have very little surface area, and photosynthesis is limited to the amount of energy the leaves can absorb as well as carbon that the leaves and roots can make available to build new plant cells. For this reason, for early growth the seedling uses the carbon and energy stored in the seed as well as nutrients in the seed. If a plant gets a head start by having available additional seed components in combination with sufficient additional fertilizer nutrients, then the seedling more efficiently takes up nutrients and can produce more growth through photosynthesis. The head start allows the plant to outcompete other plants and weeds and to put on growth before pests such as insects and molds have had a chance to multiply. As a result, plants with an early advantage are healthier and go on to produce greater crop yields. When a plant seed first sprouts, the only nutrients and energy available for growth are stored in the seed. Roots that form at spouting allow the plant to gather nutrients from the soil as well as to uptake energy and gases in the soil even before the plant leaves are formed. Fine roots (hairy roots) are known to be most important for nutrient uptake. If a plant is stimulated to produce early roots, these roots give the plant a head start that allows it to more efficiently take up nutrients.

It is known that leaves of plants take up carbon dioxide and gather energy from the sun for photosynthesis to produce new plant growth. However, the amount of carbon dioxide in air is extremely low (currently about 400 ppm). Carbon is a limiting nutrient in plant growth, and thus finding other ways to supply carbon dioxide to plants have been investigated for years. Further, the leaves of a small seedling when it has emerged have very little surface area, and photosynthesis to convert energy and carbon dioxide to food for the plant is limited to the amount of energy the leaves can absorb from sunlight as well as carbon available to build new plant cells.

In the past, studies into supplying carbon dioxide to the roots of plants have shown improved plant growth and yield. These studies have shown increased root growth and improved nutrient uptake. Also, as soil temperature increases, soil organisms flourish, consume nutrients in the soil, and produce carbon dioxide as a by-product. Over time, this causes the carbon dioxide in the soil to increase. Earlier growth of soil organisms can be promoted by supplying energy in the form of carbohydrates and thereby increase the early levels of carbon dioxide in the soil resulting in early growth of plant roots.

Coating seed is a common practice in agriculture. Seed coatings to protect plants against disease, decay, and prey is commonly practiced. Further, seed coatings are used to provide microbiologicals such as Rhizobacteria and Mycorrhizal fungi that improve soil health and interact with the plant to promote growth.

SUMMARY OF THE INVENTION

A novel seed coating has been developed to provide plants as they sprout from seeds additional energy and nutrients by using a seed grind and optionally additional carbon dioxide and energy.

The present invention relates to a seed coating comprising a seed grind and can also include a source of sugar and/or a source of bicarbonate. The invention further relates to methods of growing plants using the seed coating. The invention can supply plant roots with additional uptake-available plant nutrients, carbon, and energy-rich carbohydrates from the seed grind, and can also include a source of bicarbonate and/or source of sugar to promote surprisingly rapid growth that helps to overcome the low surface area of early leaves and thereby increase plant growth. The plant nutrients, carbon, energy-rich carbohydrates, source of bicarbonate, and source of sugar are readily available to roots early in the growth of the plant.

When used, the source of bicarbonate can provide carbon dioxide to the plant roots.

An alternative embodiment of the invention relates to a seed coating comprising a seed grind and a source of bicarbonate.

An alternative embodiment of the invention relates to a seed coating comprising a seed grind and source of sugar.

An alternative embodiment of the invention relates to a seed coating comprising a seed grind, a source of bicarbonate, and a source of sugar.

An alternative embodiment of the invention relates to a seed coating comprising a seed grind, a source of bicarbonate, and a source of fertilizer nutrient.

An alternative embodiment of the invention relates to a seed coating comprising a seed grind, and a source of sugar, and a source of fertilizer nutrient.

An alternative embodiment of the invention relates to a seed coating comprising a seed grind, a source of bicarbonate, a source of sugar, and a source of fertilizer nutrient. An alternative embodiment of the invention relates to a seed coating comprising a seed grind applied to the seed with a renewable biodegradable adherent comprising sucrose octaester.

The seed coating of the invention can increase early root growth and early leaf and stem growth in plants. The current invention is effective for growing many plants and crops including cotton, soybeans, rice, wheat, corn, sugar beets, ornamental plants, trees, turf grasses, vegetables, sorghum, fruit, bushes, energy grasses, and other plants grown from seed.

DETAILED DESCRIPTION OF THE INVENTION

Without being bound by any theory, the inventors believe that the present invention provides a complete package of energy, carbon, proteins, nutrients, secondary nutrients, and micro nutrients in the form of a seed grind. In addition, the present invention includes a source of carbon dioxide for plant uptake through the roots in the form of bicarbonate and well as readily available additional energy and carbon in the form of sugar. This combination of ingredients is specially balanced to give the plant what it needs for early growth that provides an unexpected increase in plant growth and crop yield.

Without being bound by any theory, the inventors believe the inventive fertilizer enhances early root growth of plants and early plant growth as will be shown by our examples.

It is well documented by agronomists that when a plant has a head start, it is a healthier and more productive plant. A set of tests is performed using a unique approach to observe early root growth without damaging the plants. This can be accomplished by planting seeds in cups of soil where the cup is transparent. This transparent cup is then placed inside an opaque cup. The coated seeds are planted in the soil against the inside surface of the transparent cup so that roots are checked simply by pulling the transparent cup out of the opaque cup and then replacing it when finished with the observation. The opaque cup protects the roots from light during growth. The roots can be viewed and pictures taken without disturbing the plants as they are developing and therefore a view of the early growth of the roots is possible. Seeing the early roots reveals how quickly they develop and allows them to be compared with roots for baseline tests and thereby shows the extreme benefits of coated seed even before significant plant leaves are formed. These observations and the crop yields obtained later for the plants that are transplanted from the cups demonstrates that early improved plant growth development for the invention results in increased plant growth and increased crop yield. Even early in the plant growth, the improvements in the roots of the plants grown from the invention are dramatically evident to the observer. Without being bound by any theory, the inventors believe that this is because the plant's need for nutrients, carbon dioxide, and energy is supplied before the leaves of the plants can provide them.

Figure 1:
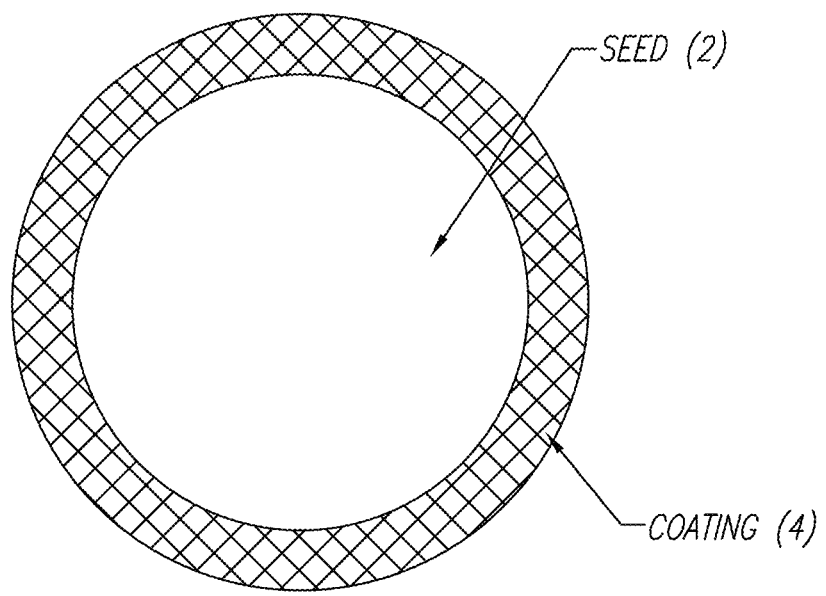
FIG. 1 attached is drawing shows a seed (2) with a coating (4) thereon.
Figure 2:
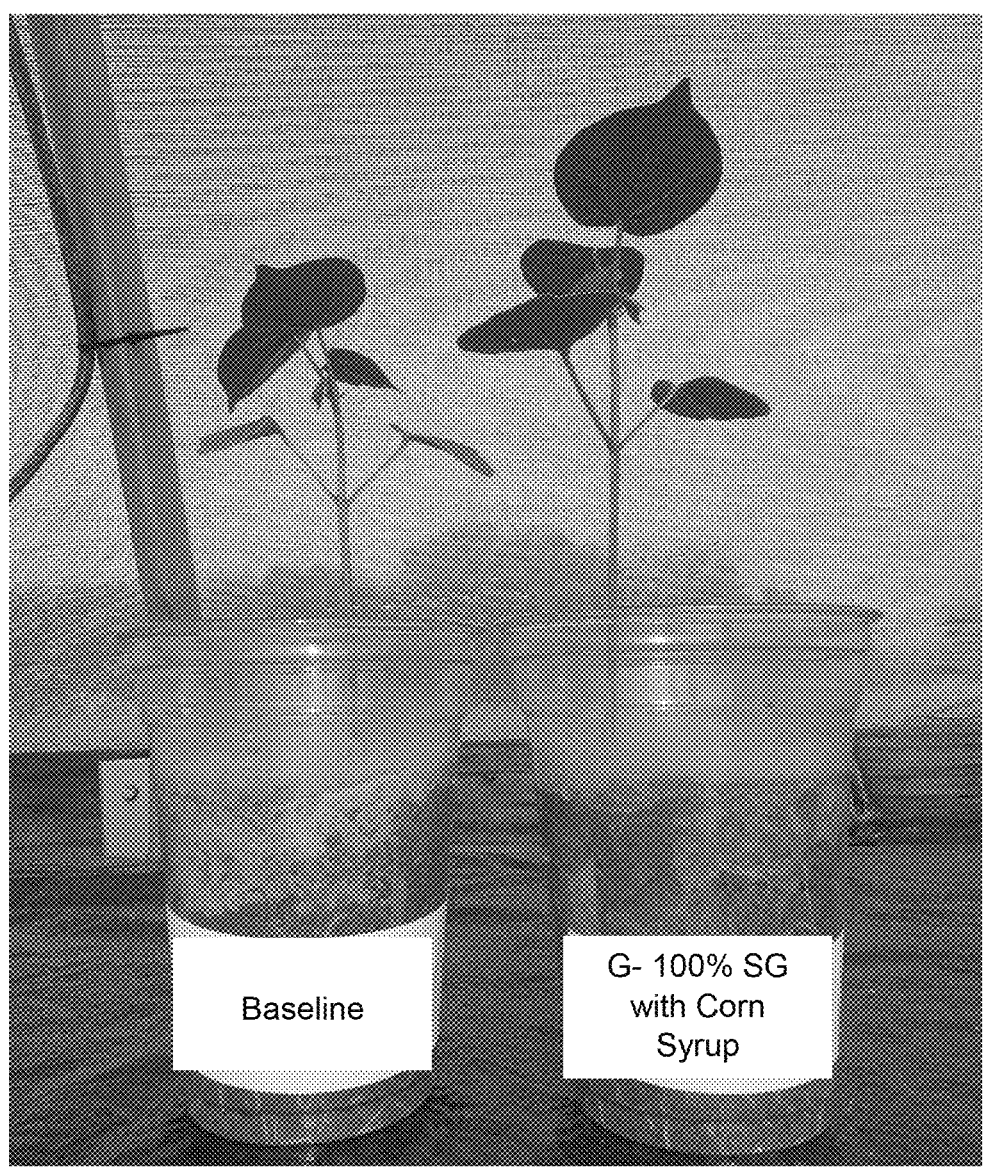
FIG. 2 is an annotated photograph comparing two plants grown in Example 5.

FIG. 2 is an annotated photograph comparing two plants grown using the cup method described above. The cotton plant on the left labeled as baseline was grown under the same conditions as the cotton plant in the cup on the right except that it was grown from a seed that was not coated with the invention. The plant in the cup on the right was grown from seed coated with inventive coating and the difference in the seedlings is dramatically visible. The coated seed according to the present invention provide a surprising and unexpected growth rate compared to an uncoated seed.

For this description, crop yield refers to the weight of plant product per unit growing area, wherein the plant product is the part of the plant that is valuable as a commercial product, such as grain for example. Crop yield is typically expressed as kg/hectare, tonnes/hectare, bushels/acre, bushels/hectare or pounds/acre depending on the type of crop grown.

A seed grind is ground seed. For this invention, seed can be one of the following: whole seed or whole seed without a seed coating. For rice, the whole seed is comprised of a hull (seed coating) as well as bran surrounding an endosperm and a germ and is referred to as rough rice. For rice, if the hull is removed the seed is brown rice. If the bran is removed, the seed is white rice. Cereal crops have bran surrounding the seed and when ground, the resulting seed grind is referred to as whole grain seed grind or brown seed grind.

Seed grind can include seed that is not clean or pure and may not be considered safe for human consumption since the seed grind is used in the invention for the growth of plants. Seed grind can include other ingredients such as one or more of the group comprising additional plant parts, dirt and/or other contaminants, molds, fungi, dispersing agents, parting agents, binders, bacteria, herbicides, pesticides, fungicides, stabilizers, and/or other contaminants or additives. This seed grind does not require the use of seed that has been cleaned to levels for human consumption.

Without being bound by any theory, the inventors believe that using a seed grind formed from ground up seeds increases the available seed ingredients used to grow the initial roots from a seed, which greatly enhances the initial root and plant growth. The early growth of roots is far more beneficial than enhancement of plant growth later in the growing cycle. For example, plants having enhanced early root growth stay ahead of other plants not having enhanced early root growth throughout the entire growing season. Preferably, the seed grind is formed from the same type of seed to be grown. For example, for growing rice seed, ground up rice seeds (seed grind) is preferably used to enhance the early growth of roots from the seed. However, other types of seed grind (non-rice seeds) can be used as an enhancer for rice. Likewise, for example, brown rice seed grind (non-cotton seeds) has been found to be effective at enhancing the early growth of roots and plants from cotton seeds, corn seeds, and wheat seeds.

Seed grind can contain many benefits for plants. For example, Table 1 shows a comparison of energy and nutrients of various seeds, according to USDA Nutrient Database (https://fdc.nal.usda.gov/).

TABLE 1

Energy and Nutrients in Selected Grains
Nutritional Value per 100 g

|  | Brown Rice | White Rice | Whole Wheat | Corn Meal (Corn Seed Grind) | Corn Starch |
|---|---|---|---|---|---|
| Energy | 370 kcal | 370 kcal | 332 kcal | 361 kcal | 375 kcal |
| Carbohydrates | 77.24 g | 81.68 g | 74.48 g | 76.85 g | 87.5 |
| Sugars | 0.85 g | Not reported | 1.02 g | 0.64 g | 0 |
| Dietary Fiber | 3.52 g | 2.8 | 13.1 g | 7.3 g | 0 |
| Fat | 2.92 g | 0.55 g | 1.95 g | 3.86 g | 0 |
| Protein | 7.82 g | 6.81 g | 9.61 g | 6.93 g | 0 |
| Calcium | 23 mg | 11 mg | 33 mg | 7 mg | 0 |
| Iron | 1.47 mg | 1.6 mg | 3.71 g | 2.38 mg | 0 |
| Magnesium | 143 mg | 23 mg | 117 g | 93 mg | 0 |
| Phosphorus | 333 mg | 71 mg | 323 mg | 272 mg | 0 |
| Potassium | 223 mg | 77 mg | 394 mg | 315 mg | 0 |
| Selenium | 23.4 µg | 15.1 µg | 12.7 µg | 15.4 µg | 0 |
| Sodium | 7 mg | 7 mg | 3 mg | 5 mg | 0 |
| Zinc | 2.02 mg | 1.2 mg | 2.96 mg | 1.73 mg | 0 |

Brown rice also contains many vitamins. As can be seen from Table 1, brown rice contains energy including carbohydrates and sugars as well as nutrients that are beneficial to plant growth. Brown rice seed grind contains more than white rice seed grind. Similarly, corn seed grind contains nutrients not found in corn starch.

Based on the chemical formula for corn starch, the percent carbon present in corn starch is 46.8%. According to Xue, the carbon in rice grain is 53-64% (Xue, W-ei, "Evaluation of biophysical factors driving temporal variations in carbon gain, water use and yield production in rice," Thesis, Lanzhou University, January 2015).

An alternative embodiment of the invention is a seed coating comprising a seed grind.

Seed grind including the whole seed can provide more benefit to the growth of plants than seed grind that includes only seed without the hull, coating, and/or bran. For the invention, the seed grind comprises one or more selected from the group rice seed grind, brown rice seed grind, white rice seed grind, rough rice seed grind, rye seed grind, cornmeal seed grind, soybean seed grind, buckwheat seed grind, triticale seed grind, wheat seed grind, whole grain wheat seed grind, oat seed grind, and/or others. Preferably the seed grind used is brown rice seed grind and/or rough rice seed grind.

The invention may also include a source of bicarbonate. The source of bicarbonate comprising at least one source selected from the group ammonium bicarbonate, potassium bicarbonate and sodium bicarbonate. Preferably, the source of bicarbonate can be at least one of the alkali bicarbonates.

The invention further can include one or more source of sugar selected from the group comprising sucrose, fructose, galactose, glucose, lactose, maltose, xylose, powdered sugar, corn syrup, cane syrup, agave, sorghum, honey, sugar cane, sugar beets, fruits, vegetables, and compounds that form or release sugar when the coated seed is planted in soil.

A source of fertilizer nutrient of the invention can comprise one or more of the following sources of nutrients:
1) one or more nitrogen compounds selected from the group comprising urea, ammonium nitrate, ammonium sulfate, calcium nitrate, diammonium phosphate (DAP), monoammonium phosphate (MAP), potassium nitrate, ammonium bicarbonate, potassium nitrate, and/or sodium nitrate;
2) one or more phosphorous compounds selected from the group comprising triple super phosphate, single super phosphate, diammonium phosphate, monoammonium phosphate, monopotassium phosphate, dipotassium phosphate, tetrapotassium pyrophosphate, and/or potassium metaphosphate;
3) one or more potassium compounds selected from the group comprising potassium chloride, potassium bicarbonate, potassium nitrate, potassium sulfate, monopotassium phosphate, dipotassium phosphate, tetrapotassium pyrophosphate, and/or potassium metaphosphate; and
4) one or more secondary nutrients, and micronutrients sources selected from the group comprising elemental sulfur, calcium carbonate (limestone), dolomite, gypsum, shell, marl, iron sulfate, iron oxides, chelated iron, iron nitrate, zinc sulfate, zinc oxide, chelated zinc, zinc-oxysulfate, zinc carbonate, copper oxide, copper sulfate, copper nitrate, magnesium nitrate, magnesium sulfate, magnesium oxide, sodium borate, chelated manganese EDTA, calcium sulfate, calcium nitrate, calcium oxide, magnesium carbonate, selenium sulfate and selenium oxide, sodium tetraborate decahydrate (borax), sodium tetraborate pentahydrate, sodium tetraborate-pentaborate, colemanite, ammonium molybdate, sodium molybdate, molybdic oxide, sodium bicarbonate, and/or manganese sulfate, to name a few;

The source of bicarbonate of the invention is one or more selected from the group sodium bicarbonate, potassium bicarbonate, and/or ammonium bicarbonate.

Because the seed coating is applied to the seed, the coating by nature of the invention immediately can be available to young plant as soon as the roots form and can be effective to promote growth at lower amounts of application than would be needed to achieve the same level of growth enhancement by broadcasting the seed coating components on the field.

The seed coating can be applied to a seed by any desired method, such as film coating, pelleting, or encrusting. Conventional seed coating methods are now well-known and the carrier components used in conventional seed coating methods can be utilized, such as binders.

The seed coating can be applied to the seed using one or more adherent that is essentially free of water. The adherent acts as a glue to hold the seed coating to the seed. Adherents include waxes such as bees wax, paraffin wax, microcrystalline waxes, vegetable waxes such as soy wax, biodegradable sucrose ocatestesr, and more.

An alternative means of applying the seed coating can use adherents that contain water and crystallize when dried. These adherents can include one or more of the group corn syrup, cane syrup, agave, maple syrup, and more.

An alternative means of applying the seed coating can use compression of the coating onto the seed without the use of water similar to methods used to make tablets.

An alternative means of applying the seed coating can use liquids free of water to react to hold the coating to the seed such as is used in epoxy coating and/or the polymerization of materials.

If soil tests show soil for growing a plant to be deficient in one or more nutrients, then a first fertilizer that comprises a small amount of nitrogen with other primary nutrients, secondary nutrients, and micronutrients at the levels indicated by the soil test can be applied to the soil. The first fertilizer can be applied just before, with, or just after the coated seed of the invention.

At planting and prior to, with or after planting of the coated seed, a first fertilizer can be applied to the soil. This first fertilizer comprises preferably up to 50.4 kg/hectare (45 pounds/acre) nitrogen, more preferably up to 44.8 kg/hectare (40 pounds/acre) nitrogen, more preferably 16.8-39.2 kg/hectare (15-35 pounds/acre), and most preferably 22.4-33.6 kg/hectare (20-30 pounds/acre) of first nitrogen. In addition, the first fertilizer can include other nutrients and micronutrients recommended based on the crop being grown and the soil test results on the soil used to grow the crop.

Thus, the present invention can include methods of applying the present, inventive coated seed, the application of a first fertilizer followed by the application of the present inventive coated seed or applying the first fertilizer and inventive coated seed simultaneously, or applying the first fertilizer contained within the inventive coated seed.

The first fertilizer can comprise one or more of the following nutrients:
1) one or more nitrogen compounds selected from the group comprising urea, ammonia, ammonium nitrate, ammonium sulfate, calcium nitrate, diammonium phosphate (DAP), monoammonium phosphate (MAP), potassium nitrate, ammonium bicarbonate, urea-ammonium nitrate (UAN), potassium nitrate, and/or sodium nitrate;

2) one or more phosphorous compounds selected from the group comprising triple super phosphate, single super phosphate, diammonium phosphate, monoammonium phosphate, monopotassium phosphate, dipotassium phosphate, tetrapotassium pyrophosphate, and/or potassium metaphosphate;
3) one or more potassium compounds selected from the group comprising potassium chloride, potassium bicarbonate, potassium nitrate, potassium sulfate, monopotassium phosphate, dipotassium phosphate, tetrapotassium pyrophosphate, and/or potassium metaphosphate;
4) one or more secondary nutrients, and micronutrients sources selected from the group comprising elemental sulfur, calcium carbonate (limestone), dolomite, gypsum, shell, marl, iron sulfate, iron oxides, chelated iron, iron nitrate, zinc sulfate, zinc oxide, chelated zinc, zinc-oxysulfate, zinc carbonate, copper oxide, copper sulfate, copper nitrate, magnesium nitrate, magnesium sulfate, magnesium oxide, sodium borate, boric acid, chelated manganese EDTA, calcium sulfate, calcium nitrate, calcium oxide, magnesium carbonate, selenium sulfate and selenium oxide, sodium tetraborate decahydrate (borax), sodium tetraborate pentahydrate, sodium tetraborate-pentaborate, colemanite, ammonium molybdate, sodium molybdate, molybdic oxide, sodium bicarbonate, and/or manganese sulfate, to name a few;
5) one or more liquid nutrient sources selected from the group comprising urea-ammonium nitrate (UAN), ammonia, bio slurries, and other slurries and suspensions; and
6) one or more organic nutrient sources selected from the group comprising manures, animal litters, and others.

Without being bound by any theory, the inventors believe the inventive fertilizer enhances early root growth of plants and early plant growth as will be shown by our examples.

All amounts of components of the coating are weight % based on the total weight of the coating, unless otherwise stated. For a preferred coating, the coating comprises an amount of 0.5 to 99 wt. % seed grind and an amount of 1 to 99 wt. % source of sugar.

For another preferred coating, the coating comprises an amount of 0.5 to 99 wt. % seed grind and an amount of 1 to 75 wt. % source of bicarbonate.

For another preferred coating, the coating comprises an amount of 1 to 99 wt. % seed grind, an amount of 1 to 75 wt. % source of sugar, and an amount of 1 to 75% source of bicarbonate.

For another preferred coating, the coating comprises an amount of 1 to 100 wt. % seed grind.

A level of coating of the invention means the weight of the seed coating as a percentage of the total weight of the coated seed. A preferable level of coating is from 0.5 to 85 wt. %, preferably 10 to 75 wt. %.

A particularly effective coated seed of the invention comprises coating cotton seed with potassium bicarbonate, brown rice seed grind, and corn syrup as shown in Example 5.

A further method of the invention comprises the following steps:
Step 1) Test soil to identify first fertilizer needed to maximize root and plant growth; Step 2) Plant coated seed in preferably 20 to 1000 cubic cm first fertilized soil, more preferably 5 to 450 cubic cm of first fertilized soil; Step 3) Transplant the plants preferably 1 to 16 weeks after emergence, more preferably 3 to 8 weeks after emergence; and Step 4) Test the soil of the transplanted plants and fertilize.

An alternative inventive method comprises the following steps:
Step 1) Test the soil to identify first fertilizer needed to maximize growth; Step 2) First fertilize the soil; Step 3) Plant coated seed; and Step 4) Fertilizer with additional fertilizer at least 2 weeks after emergence.

An additional effective method of the invention includes the following:
Step 1) Reserving a portion of harvest of a crop to form into a seed grind; Step 2) Applying the seed grind to seed to produce a coated seed; Step 3) Performing soil tests to identify primary nutrient, secondary nutrient, and micronutrient deficiencies; Step 4) Applying first nutrients to the soil early in growth of a crop being grown at more than the levels typically recommended for the crop being grown; Step 4) Planting the coated seed.

When coated seed of the invention is used, more nitrogen should be applied to the crop than is typically applied because the increased plant growth will require increased amounts of nitrogen. The nitrogen can be applied as a first fertilizer as well as later in the crop growth. The application of additional nitrogen with the coated seed produces an increase in crop yield that is much more than is produced by applying the same level of nitrogen fertilizer without the coated seed.

All of the seed coating use seed grind. For example, a rice farmer can now form the seed grind using seeds from a previous crop. Previous to the present invention, a small percentage of the crop can be saved for use in planting for growing the next season. However, now with the present invention, an additional small percentage of the crop should be retained for grinding into a seed grind for a surprisingly increased growth the next season. The increased growth more than offsets the additional small percentage of the crop retained.

In a still further method, the seed grind optionally containing source of bicarbonate and/or source of sugar be applied seed with a fertilizer of the applicator's choice.

A particle size range of a seed grind can be preferably 95% of the particles by weight between 44 micrometers (325 ISO sieve designation) and 2.00 mm (10 ISO sieve designation) or preferably 90% of the particle by weight between 63 micrometers (230 ISO sieve designation) and 2.00 mm (10 ISO sieve designation). We believe that seed grinds having a higher percentage of larger particle sizes will have a slower release of benefits to a plant over time and that seed grinds having a higher percentage of lower particles sizes will have a faster release of benefits to a plant over time. Thus, the size of the seed grind can be adjusted for the particular application as desired.

The present invention will be demonstrated with reference to the following examples, which are of an illustrative nature only and which are to be construed as non-limiting.

EXAMPLES

Example 1

Seed used for this example was *Oryza sativa* long grain rice variety Diamond™ seed treated with Nipslt Suite® (an insecticide and fungicide) and AV-1011® (a bird repellent) which was carefully selected as representative of all rice grown commercially and provides an excellent model for testing commercial rice. This rice seed was coated with brown rice seed grind. The coating was applied by spraying the seed lightly with water and then rolling it in the powder.

The resulting coated seed were visually inspected and then separated into two levels of coating: low and high.

Glass cylindrical vases which were 2.54 cm in diameter and 22.9 cm tall were filled to 2.54 cm from the top with soil. The rice seed was planted 1.9 cm beneath the soil surface and covered with sand. The vases were then wrapped with black paper, placed under artificial grow lights with a timer was set to provide light from 6 am to 6 pm, and watered regularly. After 41 days, the plants were carefully removed from the vases, thoroughly rinsed, and placed in an oven set to 50° C. to dry. The dry weight of the roots and plants are provided in Table 2.

TABLE 2

Dry Plant Weights and Dry Root Weights for Example 1 Tests of Coated Rice Seed

| Seed Coating | Weight of Roots (g) | % Difference in Roots Weight |
| --- | --- | --- |
| Uncoated Seed | 0.1490 | Baseline |
| Brown Rice Seed grind - Low Level | 0.1594 | +6.98% |
| Brown Rice Seed grind - High Level | 0.1722 | +15.6% |

Conclusions:
Rice seed coated with brown rice seed grind produced an increase in root weight for plants grown 41 days.
Higher levels of seed coating produced more root growth than lower levels of seed coating.
Coating seed with brown rice seed grind produced up to 16% increase in early root weight as compared to plants grown from uncoated seed.

The significant increases in early root weight were surprising and unexpected based on the general knowledge had in the art prior to the present invention.

Example 2

For example 2, wheat seed was coated by lightly spraying the seed with water and then rolling the seed in brown rice seed grind.

Vases were prepared as discussed in Example 1. The wheat seed was planted 2.54 cm (1 inch) beneath the soil surface and covered with sand. The vases were placed under artificial grow lights and a timer was set to provide light from 6 am to 6 pm. The vases were watered regularly to maintain a normal moisture level. After 33 days, the plants were carefully removed from the vases, rinsed and placed in a 50° C. oven to dry. The dry weights are presented in Table 3.

TABLE 3

Dry Weights for Example 2 Wheat Tests

| Coating | Weight of Plants and Roots (g) | Weight of Roots (g) | Total Weight % Difference | Root Weight % Difference |
| --- | --- | --- | --- | --- |
| Brown Rice Seed grind | 0.2587 | 0.1649 | +22% | +27% |
| No Coating | 0.2117 | 0.1301 | Baseline | Baseline |

Conclusions
After 33 days, wheat grown from seed coated with a brown rice seed grind coating produced a 27% increase in root weight and 22% increase in root and plant weight as compared to wheat grown with no seed coating.

The difference in percent increase in root weight was more than the difference in percent increase in total plant and root weight showing that the coating had more impact on early root growth than on growth of plant leaves.

The significant increases in early root weight and total plant and root weight were surprising and unexpected based on the general knowledge had in the art prior to the present invention.

Example 3

Seeds coated for planting in Example 3 were cotton seeds. The cotton seed was obtained from a local cotton gin and were already pre-coated with a seed conditioning treatment. The cotton seed was pre-weighed to fall within the range of 0.0895 g to 0.1035 g.

The cotton seed for Example 3 was coated with the inventive coating by first rolling the seed in corn syrup and then rolling it in a mixture of 50 wt. % Baking Powder and 50 wt. % Brown Rice Seed Grind. The coating on 10 seeds was weighed and the average % coating was calculated and given in Table 4. The corn syrup used to coat the seeds contained water and may not have fully dried before weighing the seed with the coating on it. The baking powder used was Clabber Girl® Double Acting Baking Powder comprising corn starch, baking soda, sodium aluminum sulfate, and monocalcium phosphate.

TABLE 4

Approximate Coating on 10 Cotton Seeds for Example 3

| Seed Coating Powder Mixture | Weight of Seeds Before Coating (g) | Weight of Coating on 10 Seeds (g) | Average % Coating |
| --- | --- | --- | --- |
| E | 1.0 | 6.6 | 87% |
| BL | Baseline - no coating mixture was applied | | |

16 ounce clear containers (cups) were prepared for planting with the coated seed by placing 400 g of sieved locally sourced top soil in each container. Each container was fertilized with 0.125 g super phosphate (N-P-K of 0-18-0) that was mixed into the soil. Each container was also given additional first fertilizer as 25 mL of solution. The first fertilizer solutions contained 0.2 g urea, 1.0 g Epsom Salt, and 0.2 g potassium chloride per 25 mL of solution.

After applying the first fertilizer, the coated seeds were planted approximately 2.54 cm (1 inch) beneath the soil surface and the containers were given an additional 25 mL of water. Two seeds were planted in each container and three containers for each test was planted. The containers were placed in opaque containers to prevent light from getting to the roots and the soil was watered regularly. The containers were then placed under grow lights. By planting the seeds in clear containers, the root growth could be observed on a regular basis. If two seeds sprouted in a container, the smaller sprout was removed.

The plants were transplanted into larger containers after 29 days. The larger containers were 18.9 liters (5 gallons). These containers had holes drilled in them for drainage. Locally sourced sieved top soil was used to grow the plants. Each container was filled to about 7.6 cm (3 inches) from the top of the container. This was about 20 kg of soil. A fertilizer solution containing 0.28 g urea and 0.63 g of Epsom salt was applied to the soil and one cotton plant was transplanted to each container. The containers were placed in a field and watered regularly.

Twenty-one days after transplanting, the containers were each given 1.73 g of monoammonium phosphate, 2.0 g KCl, 0.7 g ZnSO$_4$·H$_2$O, 0.50 g boric acid, and 33.4 g Epsom salt. Thirty-nine days after transplanting each container was given 1.12 g of urea and an additional 1.0 g was given 39 days later.

Cotton bolls from the plants were cut, dried, and weighed. The average weights of the bolls per container are shown in Table 5.

TABLE 5

Weight of Dry Cotton Bolls for Example 3

| Label | Average Dry Wgt. of Cotton Bolls (g) | % Difference from Baseline | Seed Coating Formulation |
|---|---|---|---|
| BL.1 | 54.3 | 0.0% | Baseline |
| E.1(b) | 67.0 | 23.4% | 50% Baking Powder + 50% Rice Seed Grind + Corn Syrup |

Cotton bolls produced by plants grown from seed coated with a brown rice seed grind, corn syrup, and baking powder coating produced an average 23% increase in cotton boll weight compared to cotton bolls produced by cotton plants grown with no inventive seed coating.

The significant increases in cotton boll weight was surprising and unexpected based on the general knowledge had in the art prior to the present invention.

Example 4

Seeds coated for planting in Example 4 were cotton seeds. The cotton seed was obtained from a local cotton gin and was already pre-coated with a seed conditioning treatment. The cotton seed was pre-weighed to fall within the range of 0.0895 g to 0.1035 g.

The cotton seed for Example 4 was coated with the inventive coating by first rolling the seed in corn syrup and then rolling it in a mixture of 50 wt. % Sodium Bicarbonate and 50 wt. % Brown Rice Seed Grind. The coating on 10 seeds was weighed and the average % coating was calculated and given in Table 4. The corn syrup used to coat the seeds contained water and may not have fully dried before weighing the seed with the coating on it.

TABLE 6

Coating on 10 Cotton Seeds for Example 4

| | Weight of Seeds Before Coating (g) | Weight of Coating on 10 Seeds (g) | Average % Coating |
|---|---|---|---|
| Coated Seed | 0.9 | 4.8 | 84% |
| BL | Baseline - no coating mixture was applied to seed | | |

16 ounce clear containers (cups) were prepared for planting with the coated seed by placing 400 g of sieved locally sourced top soil in each container. Each container was fertilized with 0.125 g super phosphate (N-P-K of 0-18-0) that was mixed into the soil. Each container was also given additional first fertilizer as 25 mL of solution. The first fertilizer solutions contained 0.2 g urea, 1.0 g Epsom Salt, and 0.2 g potassium chloride per 25 mL of solution.

After applying the first fertilizer, the coated seeds were planted approximately 2.54 cm (1 inch) beneath the soil surface and the containers were given an additional 25 mL of water. Two seeds were planted in each container. The containers were placed in opaque containers to prevent light from getting to the roots and the soil was watered regularly. The containers were then placed under grow lights. By planting the seeds in clear containers, the root growth could be observed on a regular basis. If two seeds sprouted in a container, the smaller sprout was removed.

29 days after planting the seeds, the plants were carefully removed from the containers, cleaned, dried, and weighed. The weights are shown in Table 7 below.

TABLE 7

Weight of Plants and Roots for Example 4

| Coating | Weight of Plants and Roots (g) | Total Weight % Difference |
|---|---|---|
| 50% Sodium Bicarbonate + 50% Brown Rice Seed Grind + Corn Syrup | 0.2587 | +22% |
| No Seed Coating | 0.2117 | Baseline |

After 29 days, cotton plants grown from seed coated with a brown rice seed grind, sodium bicarbonate, and corn syrup coating produced a 22% increase in plant and root weight compared to cotton plants grown with no seed coating.

The significant increase in early root weight and total plant and root weight was surprising and unexpected based on the general knowledge had in the art prior to the present invention.

Example 5

Seeds coated for planting in Example 5 were cotton seeds. The cotton seed was obtained from a local cotton gin and were already pre-coated with a seed conditioning treatment. The cotton seed was pre-weighed to fall within the range of 0.0895 g to 0.1035 g.

The cotton seeds for Example 5 were coated with inventive coating by first rolling the seed in corn syrup and then rolling it in a mixture. The coating on 15 seeds was weighed and the average % coating was calculated and given in Table 8. The corn syrup used to coat the seeds contained water and may not have fully dried before weighing the seed with the coating on it.

TABLE 8

Approximate coating on 15 Cotton Seeds for Example 5

| Seed Coating Powder Mixture | *Seed Coating Mixture | Weight of Seeds Before Coating (g) | Weight of Coating on 15 Seeds (g) | Average % Coating |
|---|---|---|---|---|
| C | 40% KBC + 60% SG with CS | 1.4 | 0.7 | 32% |
| D | 20% KBC + 80% SG with CS | 1.5 | 0.8 | 35% |
| G | 100% SG with CS | 1.4 | 0.4 | 22% |
| BL | Baseline - no coating mixture was applied | | | |

*KBC = potassium bicarbonate, SG = brown rice seed grind, CS = corn syrup 16 ounce clear containers (cups) were prepared for planting with the coated seed by placing 420 g of sieved locally sourced top soil in each container. Each container was fertilized with 0.125 g super phosphate (N-P-K of 0-18-0) that was mixed into the soil. Each container was also given additional first fertilizer as 25 mL of solution. The first fertilizer solutions contained 0.2 g urea, 1.0 g Epsom Salt, and 0.2 g potassium chloride per 25 mL of solution.

After applying the first fertilizer, the coated seeds were planted approximately 2.54 cm (1 inch) beneath the soil surface and the containers were given an additional 25 mL of water. Two seeds were planted in each container and three containers for each test was planted. The containers were placed in opaque containers to prevent light from getting to the roots and the soil was watered regularly. The containers were then placed under grow lights. By planting the seeds in clear containers, the root growth could be observed on a regular basis. If two seeds sprouted in a container, the smaller sprout was removed.

The plants were transplanted into larger containers after 31 days. The larger containers were 18.9 liters (5 gallons). These containers had holes drilled in them for drainage. Locally sourced sieved top soil was used to grow the plants. Each container was filled to about 7.6 cm (3 inches) from the top of the container. This was about 20 kg of soil and 2.0 g of triple super phosphate was mixed into the top layer of soil in each container. A fertilizer solution containing 0.5 g urea, 2.2 g KCl, 0.7 g $ZnSO_4 \cdot H_2O$, 0.5 g boric acid, and 34.4 g of Epsom salt was applied to the soil and one cotton plant was transplanted into each container. Because it was late in the season, the containers were placed in a greenhouse and watered regularly. Three containers for test C were planted, one for test D, three for test G, and one for test BL based on the number of sprouted plants that survived.

Thirty-six days after transplanting, each bucket was given 1.12 g of urea. Fourteen days later, each bucket was given 2.37 g urea.

In December, 184 days after the cotton seeds were first planted, the cotton plants were cut at the surface of the soil, dried, and weighed. The average weights of the plants from the duplicate tests are shown in Table 9.

TABLE 9

Weight of Dry Cotton Plants for Example 5

| Label | Average Dry Wgt. of Cotton Plants (g) | % Difference from Baseline | *Seed Coating Formulation |
|---|---|---|---|
| BL.1 | 39.9 | 0% | Baseline |
| C | 49.9 | +25% | 40% KBC + 60% SG with CS |
| D | 46.9 | +18% | 20% KBC + 80% SG with CS |
| G | 43.2 | +8.4% | 100% SG with CS |

*KBC = potassium bicarbonate, SG = brown rice seed grind, CS = corn syrup

Cotton plants grown from seed coated with the invention produced an average up to 25% increase in total plant weight compared to plants grown with no inventive seed coating.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

Example 6

For Example 6, black-eyed pea seed was coated successfully using a 61 cm (24 inch) falling curtain drum where the flights inside the drum lifted and dropped the seed a short distance onto a collected pan near the top of the drum. The seed then rolled off of the collecting pan and formed a curtain of falling seed. Warm corn syrup was sprayed onto the seed at the base of the falling curtain to from spray coated seed. Rice seed grind was sprinkled onto the bed of spray coated seed after spraying a thin coating onto the seed to form our inventive coated seed. The rice seed grind was continually added until there was excessive seed grind in with the inventive coated seed after allowing the material in the drum to run for several minutes and allowing the rice seed grind to press into the spray coating. The inventive coated seed was then dried using low heat blown into the drum. The processes of spraying on corn syrup, sprinkling on rice seed grind, and drying was repeated several times. During the process, the material in the drum remained free-flowing. The inventive coating on the final product was hard.

To estimate the percent coating 100 seeds without coating were weighed and found weigh 22.8 g. Next 100 seeds with coating were weighed and found to weigh 32.2 g. Thus, the average percent coating was 29.2%.

While only a few exemplary embodiments of this invention have been described in detail, those skilled in the art will recognize that there are many possible variations and modifications which can be made in the exemplary embodiments while yet retaining many of the novel and advantageous features of this invention. Accordingly, it is intended that the following claims cover all such modifications and variations.

Example 7

For Example 7, rice seed was coated successfully using a rotary drum where the flights inside the drum were backward canted to roll the seed without lifting and dropping. Biodegradable sucrose octaester was poured onto the rolling bed of seed. Finely ground rice seed grind was sprinkled onto the bed of coated seed to form our inventive coated seed. During the process, the material in the drum remained free-flowing.

While only a few exemplary embodiments of this invention have been described in detail, those skilled in the art will recognize that there are many possible variations and modifications which can be made in the exemplary embodiments while yet retaining many of the novel and advantageous features of this invention. Accordingly, it is intended that the following claims cover all such modifications and variations.

The invention claimed is:

1. A coated seed having an enhanced seedling growth rate comprising:
   a seed; and
   a coating on the seed comprising a seed grind formed from
      0.5 to 99 wt. % of a ground whole seed,
      1 to 99 wt. % of a source of sugar, and
      a binder,
      wherein a weight of the coating as a percentage of the total weight of the coated seed is 10 to 85 wt. %, wherein the ground whole seed and the source of sugar are in an amount to enhance growth of a seedling growing from the coated seed, wherein the seed grind and the source of sugar increase available seed components required for a seedling to grow to enhance the seedling growth, and wherein the wt. % is based on the total weight of the coating.

2. The coated seed according to claim 1, wherein the source of sugar is selected from the group consisting of corn syrup, cane syrup, agave, maple syrup, sucrose, fructose, galactose, glucose, lactose, maltose, xylose, powdered sugar, corn syrup, cane syrup, agave, sorghum, honey, sugar cane, sugar beets, fruits, and vegetables.

3. The coated seed according to claim 1, wherein the source of sugar comprises a compound that forms or releases sugar when the coated seed is planted in soil.

4. The coated seed according to claim 1, wherein the seed is selected from the group consisting of cotton, soybean, rice, wheat, corn, and sugar beet.

5. The coated seed according to claim 1, wherein the seed is selected from the group consisting of ornamental plants, trees, turf grasses, vegetables, sorghum, fruit, bushes, and energy grasses.

6. The coated seed according to claim 1, wherein the seed grind is not fit for human consumption and further comprises at least one of additional plant parts, dirt, contaminants, molds, fungi, dispersing agents, parting agents, binders, bacteria, herbicides, pesticides, fungicides, stabilizers, or additives.

7. The coated seed according to claim 1, wherein the coating further comprising urea.

8. The coated seed according to claim 1, wherein the seed grind is unfit for human consumption and the fertilizer further comprising urea.

9. The coated seed according to claim 1, wherein the seed comprises rice and the seed grind comprises ground rice seed.

10. The coated seed according to claim 1, wherein the coating comprising 1% to 99% of the seed grind, 0.1% to 77% of the source of sugar, and 0.1% to 60% of a fertilizer nutrient.

11. The coated seed according to claim 1, wherein the coating further comprising an adherent selected from waxes, bees wax, paraffin wax, microcrystalline waxes, vegetable waxes, soy wax, and biodegradable sucrose octaesters.

12. A method of growing seedlings at an enhanced rate comprising:

providing a seed and a coating on the seed, the coating comprising a binder, 1 to 99 wt. % a source of sugar, and 0.5 to 99 wt. % of a seed grind formed from ground whole seed, wherein a weight of the coating as a percentage of the total weight of the coated seed is 10-85 wt. %, wherein the wt. % is based on the total weight of the coating, wherein the ground whole seed and the source of sugar are in an amount to enhance growth of a seedling growing from the coated seed;

planting the coated seed in soil to form a planted seed; and allowing the coated seed to grow into a seedling at an enhanced rate.

13. The method according to claim 12, wherein the source of sugar is selected from the group consisting of corn syrup, cane syrup, agave, maple syrup, sucrose, fructose, galactose, glucose, lactose, maltose, xylose, powdered sugar, corn syrup, cane syrup, agave, sorghum, honey, sugar cane, sugar beets, fruits, and vegetables.

14. The method according to claim 12, wherein the source of sugar comprises a compound that forms or releases sugar when the coated seed is planted in soil.

15. The method according to claim 12, further comprising measuring nutrients in a soil the seedling is planted and applying a fertilizer to the soil surrounding the planted seed.

16. The method according to claim 12, further comprising adding 15 to 25% more nitrogen to the soil than an amount required without the seed grind.

17. The method according to claim 12, wherein the seed grind comprising ground seed of a same type of plant as the seed.

18. The method according to claim 12, wherein the coating comprising urea.

19. The method according to claim 12, wherein the seed grind is unfit for human consumption and the coating further comprising a source of bicarbonate.

20. The method according to claim 12, wherein the seed comprises rice and the coating comprises ground rice seed.

21. The method according to claim 12, wherein the coating is applied to the seed in a rotary drum with lifting flights.

22. The method according to claim 12, wherein the coating comprises urea.

23. The method according to claim 12, wherein the coating further comprising an adherent selected from waxes, bees wax, paraffin wax, microcrystalline waxes, vegetable waxes, soy wax, and biodegradable sucrose octaesters.

24. A coated seed having an enhanced seedling growth rate comprising:

a rice seed; and a coating on the rice seed comprising 0.5 to 99 wt. % of a seed grind formed from a ground rice seed, and 1 to 99 wt. % a source of sugar, wherein a weight of the coating as a percentage of the total weight of the coated seed is 10-85 wt. %, wherein the wt. % is based on the total weight of the coating, wherein the ground whole seed and the source of sugar are in an amount to enhance growth of a seedling growing from the coated seed, and wherein the seed grind increases available seed components required for a rice seedling to grow to enhance the rice seedling growth.

25. A method of growing seedlings at an enhanced rate comprising:

providing a rice seed and a coating on the seed, the coating comprising 0.5 to 99 wt. % of a seed grind formed from ground rice seed, and 1 to 99 wt. % a source of sugar, wherein a weight of the coating as a percentage of the total weight of the coated seed is 10-85 wt. %, wherein the wt. % is based on the total weight of the coating, wherein the ground whole seed and the source of sugar are in an amount to enhance growth of a rice seedling growing from the coated rice seed;

planting the coated seed in soil to form a planted seed; and allowing the coated seed to grow into the rice seedling at an enhanced rate.

* * * * *